United States Patent Office 2,738,503
Patented Mar. 13, 1956

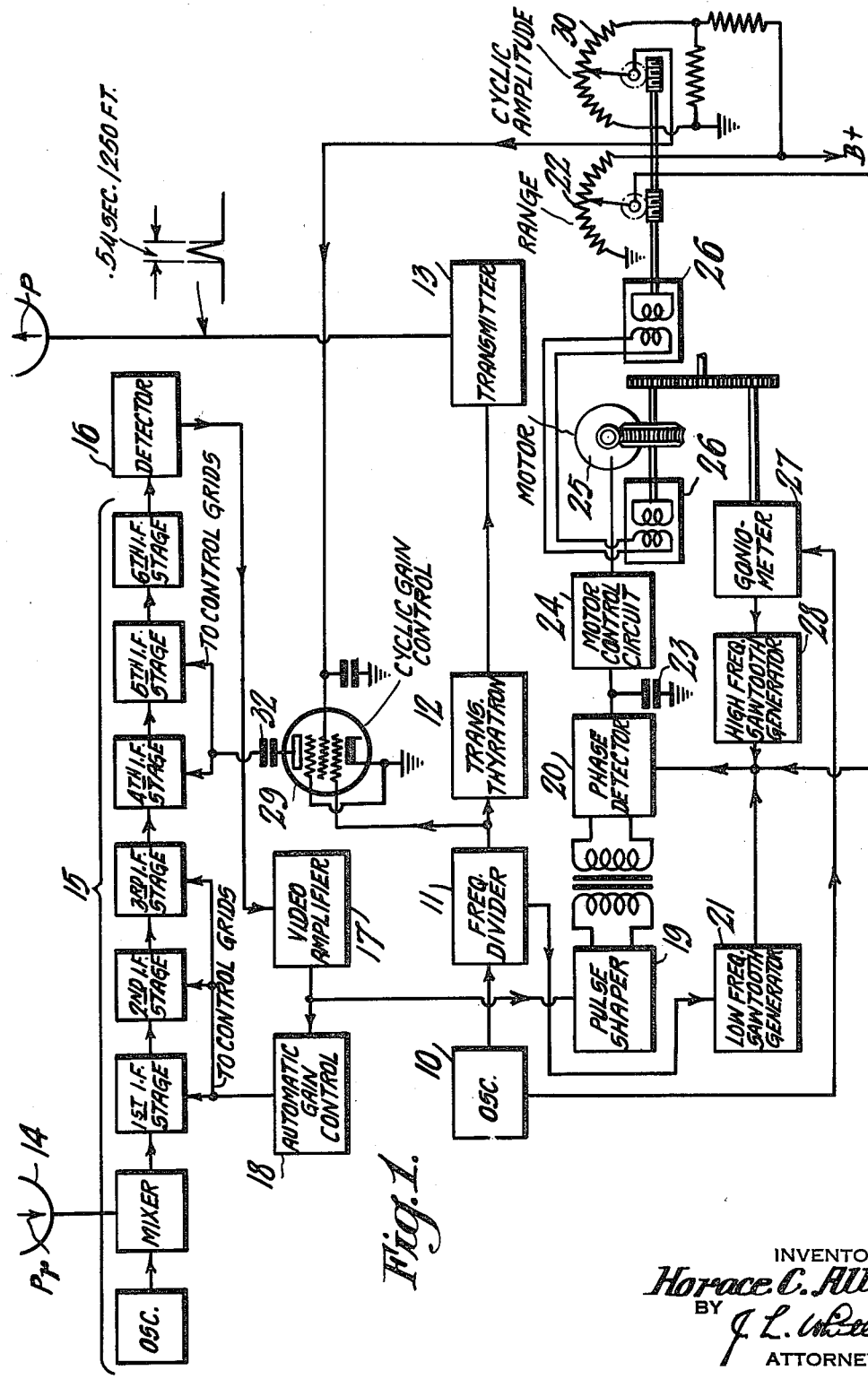

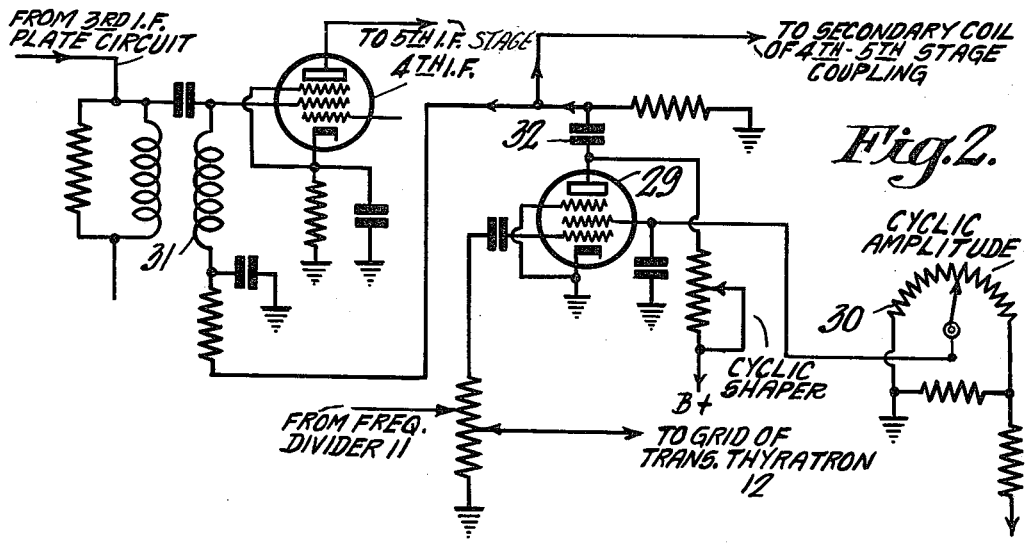
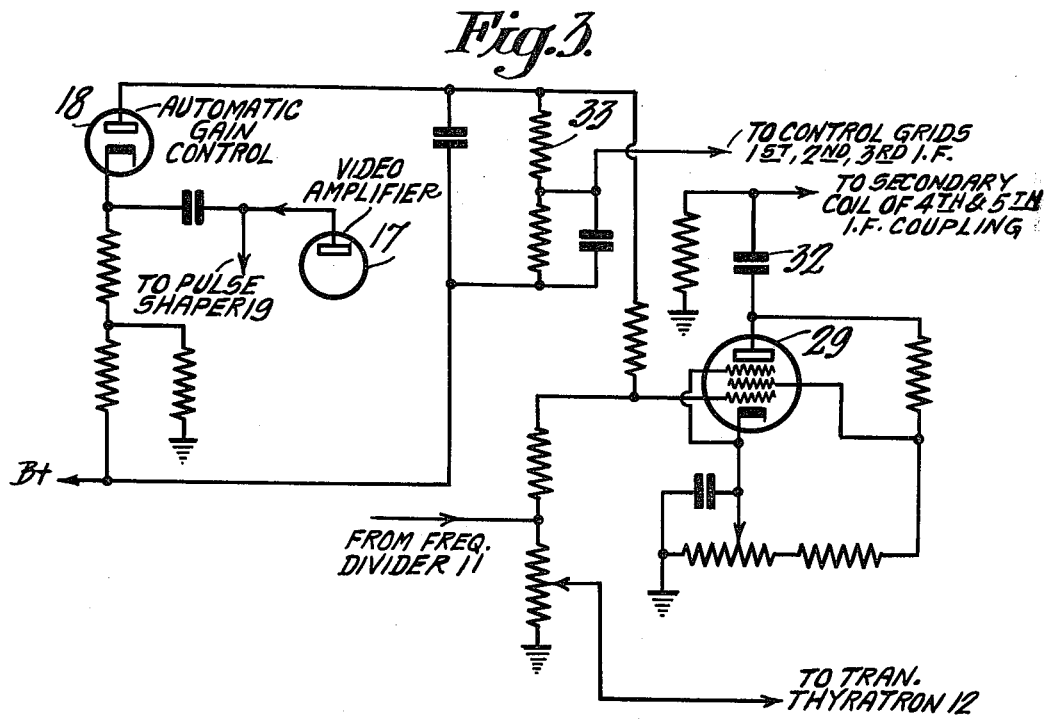

2,738,503

PULSE ECHO ALTIMETER WITH SENSITIVITY TIME CONTROL

Horace C. Allen, Princeton, N. J., assignor to Radio Corporation of America, a corporation of Delaware Application February 26, 1949, Serial No. 78,514

12 Claims. (Cl. 343—17.1)

This invention relates generally to pulse echo altimeters and particularly to such altimeters in which the received pulse is utilized to key the circuits and controlled mechanical units for determining and indicating the distance from the altimeter to the reflecting surfaces.

The principal object of the invention is to provide an altimeter system of the type specified that is capable of indicating distance with improved accuracy by a substantial diminishment of the effects of the feed-through signal from the transmitter to the receiver of the system.

Another object of the invention is to provide an automatically-controlled cyclic gain control to increase the accuracy of the distance determination by suppressing the peak voltage of the feed-through signal below that of the received pulse only during the period in which the altimeter is being operated within a predetermined range of distances from the reflecting surfaces. Cyclic gain control is also known as sensitivity time control. It is a further object of the invention to provide means and methods by which the cyclic gain control is made responsive to the distance from the altimeter to the reflecting surfaces, and by which the cyclic gain control output is reduced in magnitude below the point at which the cyclic output would cause a distortion of the wave form of the received pulse in the range of distances at which the received pulse overlaps the feed-through signal from the transmitter. The feed-through signal is the signal that unavoidably gets into the receiver to a certain extent during the instant of pulse transmission.

The invention will be better understood by reference to the following description and the accompanying drawings in which like reference characters are applied to similar elements.

In the drawings:

Figure 1 is a schematic representation of a pulse-echo altimeter that employs the received pulse to instantaneously actuate the distance determining circuits and to control the mechanical indicating units of the altimeter, and in which a cyclic amplitude potentiometer type of automatic cyclic gain control has been incorporated;

Figure 2 is a schematic diagram of one form of the automatic cyclic gain control herein described, and the associated cyclic gain control tube and the tube coupling to the intermediate frequency amplifier; and Figure 3 is a schematic diagram illustrating an automatic cyclic gain control which employs the output of an automatic gain control circuit.

The instant invention concerns improvements in a pulse echo altimeter of the type described and claimed in United States application Serial No. 77,178, filed on February 18, 1949, in the name of Randall C. Ballard, now Patent No. 2,638,587, issued May 12, 1953, and entitled Pulse Echo Distance Measuring Systems.

In general, altimeters of the type described in the aforementioned application can be essentially represented as indicated in Figure 1. The output of the oscillator 10 is fed to a frequency divider 11. The output of divider 11 is fed to the grid of the transmitter thyratron 12 to key the transmitter 13, which thereupon broadcasts a high frequency modulated pulse P. Pulse P, which is reflected back to the altimeter as Pr, is picked up by the antenna 14, mixed with the output of a local oscillator, and is amplified in the various stages of the receiver indicated generally at 15. The pulse thus amplified is rectified in the detector 16 and is applied to the grid of the video amplifier 17. The output of the video amplifier is applied both to the automatic gain control unit 18 and to the pulse-shaper 19. The output of the pulse-shaper 19 is employed to activate the phase detector 20 to which is applied a voltage generated by the low frequency sawtooth generator 21, which is proportional to the propagation time of the pulse, and the voltage output of the range potentiometer 22, which is proportional to the reading of the distance indicator at the instant the sampling is effected by the output of the pulse-shaper 19. The operation of the phase-detector 20 is such that the variation from balance between the aforementioned voltages is established on the capacitor 23, and thereafter applied to the motor control circuit 24, which initiates movement of the motor 25 and the range potentiometer 22, which is operably connected therewith, in the direction and to the extent necessary to bring the indicated range in coincidence with the actual distance traveled by the reflected pulse. The phase-detector 20 in conjunction with the capacitor 23, the motor control circuit 24, the motor 25, the servo system 26, which operably connects the motor with the range indicator 22, and the range indicator 22 therefore comprises a means for determining and indicating the distance from the altimeter to the reflecting object.

A refined determination of the indicated distance may be obtained by incorporating in the described system a phase-shifter 27 and a high-frequency saw-tooth generator 28 in the manner described more fully in the application filed in the name of Randall C. Ballard, previously referred to.

In the embodiment illustrated in Figure 1, the plate circuit of a cyclic gain control pentode 29 is connected to the control grid circuits of the fourth and fifth intermediate frequency amplifier stages. The output of the frequency divider 11 is applied to the control grid of the cyclic gain control tube to key the tube simultaneously with the transmitter 13, thus generating a negative pulse, in order to block the receiver 15 for the duration of the transmitted pulse.

In the system described, the accuracy with which the distance to the reflecting object will be determined is dependent upon the analysis of the differences between the voltages produced by the generator 21 and by the range potentiometer 22 being made instantaneously upon the return of the reflected pulse. In order to effect an instantaneous determination, the received pulse is shaped in the pulse-shaper 19 so that the pulse voltage rises to and recedes from its peak value at a high rate, and the phase-detector 20 is made responsive only to the peak voltage produced by the pulse-shaper 19. The pulse-shaper 19 is also devised so that the unit, which may be a blocking oscillator, triggers at a point about half way up the leading edge of the signal received from the video amplifier 17 in order to avoid inaccuracies introduced as a result of the varying shapes of the received pulses. It will be seen, therefore, that the inherent accuracy of the system depends upon the peak voltage of the reflected signal being maintained above that of the feed-through signal, and upon the slope of the leading edge of the reflected pulse being preserved throughout.

In a typical system of the type described, the amplitude of the feed-through signal is equal to that of the reflected signal at an altitude of about 2,000 feet. In order to have the reflected signal control the distance determining and indicating means it is necessary to reduce the gain of the receiver for the duration of the transmitted pulse when the altitude of the system is greater than about 2,000 feet. This is ordinarily accomplished by a cyclic gain control of the type previously referred to. This type of cyclic gain control, however, will continue to block the intermediate frequency amplifier stages to which it is connected in the distance range in which the peak voltage of the reflected pulse is greater than that of the feed-through signal. In the ordinary installation, the recovery time of the receiver is such that in this range the feed-through pulse overlaps the reflected pulse and causes a deformation of the slope of the leading edge of the reflected pulse and thereby introduces an error when the pulse is subsequently applied to trigger the pulse-shaper 19.

The present invention obviates this source of error by providing a cyclic gain control (sensitivity time control) output which is in part regulated by a control voltage proportional to the distance from the altimeter to the reflecting object, diminishing as the probability of the cyclic voltage effecting the leading slope of the received pulse increases, and automatically increasing to suppress the feed-through signal at the distance at which the amplitude of the feed-through signal exceeds that of the received pulse.

One method and means by which the automatic regulation of the cyclic gain control may be accomplished is shown schematically in Figure 1. A cyclic amplitude potentiometer 30 is operably connected to the range indicator 22 so that the potentiometer arm of the cyclic amplitude potentiometer is responsive to movements of the range indicator. The driving connection may be made by direct gear connections or preferably by means of servo mechanism. The output of the cyclic amplitude potentiometer 30 is applied to the screen grid of the cyclic gain control tube 29, and the constants of the potentiometer circuit are selected so that zero cyclic control voltage is applied to the screen grid when the associated distance indicator is between zero and 300 feet. The voltage delivered by the cyclic amplitude potentiometer then rises to a maximum at an indicated distance of about 3700 feet, and is maintained at the maximum for readings up to the indicator's maximum reading.

Figure 2 illustrates in detail the association of the cyclic amplitude potentiometer, the cyclic gain control tube, and the intermediate frequency stage to which the output of the cyclic gain control tube is applied. The output of the plate circuit of the tube 29 is applied to the secondary coil 31 of the transformer coupling between the third and fourth stages of the intermediate frequency amplifier. A similar connection is made to the secondary transformer coupling between the fourth and fifth stages of the intermediate frequency amplifier. The negative pulses thus delivered by the cyclic gain control tube and applied to the control grids of the fourth and fifth stages result in automatic control of the gain of these stages proportional to the distance between the system and the reflecting object during the transmitter pulse time.

The operation of the described system may be illustrated by following a course of operations of the various circuits employed as the altimeter descends from an altitude of about 4,000 feet to an altitude of 200 feet.

The output of the transmitter 13 is a high frequency modulated pulse having a duration of about .5 microsecond. The transmitter 13 is keyed by the output of the frequency divider 11 which also feeds to the control grid of the cyclic gain control tube 29. The output of the tube 29 across the capacitor 32 is a negative saw-tooth pulse which has a steep rise to its maximum voltage and a gradual fall away from the maximum voltage. The total duration of the pulse is about 1 microsecond. The amplitude and duration of the cyclic gain control pulse may be varied to some extent by changes in the character of the plate load. This pulse is applied to the control grids of the fourth and fifth intermediate frequency stages as previously described, and reduces the sensitivity of the receiver to a minimum during and immediately subsequent to the transmission of the pulse P by the transmitter. The reduced sensitivity of the receiver prevents the feed-through signal from controlling the subsequent circuits which initiate the operation of the range determining and indicating devices. The system is thus prevented from responding to the feed-through signal and from running to and locking at a zero range indication as a result of the suppressor action of the cyclic gain control. The control bias applied by the cyclic gain control tube terminates in about 1 microsecond, in which time the pulse P will have traveled a distance corresponding to about 500 feet altitude. Shortly thereafter, the recovery of the receiver will be complete and the sensitivity restored for the reception and amplification of the pulse Pr. At an altitude of 4,000 feet, the pulse Pr after reception and amplification in the receiver 15, will pass to the detector 16 which in turn feeds the video amplifier 17. The output of the video amplifier is applied to the pulse-shaper 19 and to the automatic gain control 18 which is connected to the grids of the first three stages of the I. F. amplifier. Since the attenuation of the pulse Pr is relatively large at 4,000 feet, the output of the automatic gain control would tend to increase the gain of the first three stages of the I. F. amplifier.

At the specified altitude, the amplitude of the received signal is less than that of the feed-through signal, but the received signal nevertheless controls the operation of the system as a result of the suppression of the feed-through signal by the cyclic gain control. The recovery time of the receiver and the duration of the pulse transmission are considerably less than the transit time of the pulse at the specified altitude and consequently no distortion of the wave form of the received pulse is affected during its reception and amplification. At the range indication of 4,000 feet, the setting of the cyclical amplitude potentiometer 30 is such that the maximum output of the potentiometer is being applied to the screen grid of the cyclic gain control tube 29 in order to effectively suppress the relatively stronger feed-through signal.

As the altimeter descends to about 2000 feet, the amplitude of the received pulse will approximately equal that of the feed-through signal. At this point the output of the cyclic amplitude potentiometer will begin to drop as the associated range indicator alters the setting of the potentiometer concomitantly with its movement towards a lower indicated distance. At this distance, it is still necessary to apply a potential to the screen grid of the cyclic tube which is close to maximum in order to suppress the unwanted feed-through signal. As the altimeter descends further to about 200 feet, the amplitude of the received pulse will exceed that of the feed-through signal. At this point, the received pulse having a transit time of about .5 microsecond, would normally overlap the operation of the cyclic gain control tube and the wave form of the received pulse would be distorted and an inaccurate signal would result from the cyclic suppression. At this point, however, the range indicator in its movement towards the 200 foot indication has caused the setting of the cyclic amplitude potentiometer to be changed to the extent that the control potential applied by the potentiometer cuts off the cyclic gain control tube, and the cyclic control bias to the fourth and fifth stages of the I. F. amplifier strip is removed.

In this condition, the fast acting automatic gain control 18 will respond to the voltage peak of the received pulse which at this altitude considerably exceeds that of the feed-through signal. In this manner, the received pulse is permitted to control the operation of the subsequent distance determining and indicating means without distortion due to cyclic suppressions.

Similar operation may be accomplished by the modification of the system illustrated in Figure 3. In the embodiment there illustrated, the output of the plate circuit of the automatic gain control 18 is fed to the control grid of the cyclic gain control tube 29. In this modification the automatic gain control output to the first three stages of the I. F. amplifier strip is taken from the center tap of the voltage divider 33. The output of the automatic gain control circuit varies according to the degree of attenuation of the received signal and, consequently, when applied to the control grid of the cyclic gain control tube, will cause cyclic voltage which will be minimum at low altitudes and maximum at high altitudes, thus accomplishing substantially the same regulation that is obtained by use of the cyclic amplitude potentiometer having an output which is directly related to the indicated range.

At an altitude of 200 feet, the peak voltage of the received pulse would substantially exceed that of the feed-through signal and the fast acting automatic gain control 18 will apply a negative bias to the control grids of the first three stages of the I. F. strip to reduce the gain of the receiver. A portion of the output will be applied to the control grid of the cyclic gain control tube 29 to bias the tube towards cut-off and minimize the cyclic voltage output. Thus, at low altitudes the distortion of the wave form of the received pulse as a result of cyclic suppression in the fourth and fifth stages of the I. F. amplifier strip will be minimized. As the system ascends to greater altitudes, for example to 4,000 feet, suppression of the feed-through signal is necessary in order to prevent the system from responding to the feed-through signal and to prevent the automatic gain control from adjusting to the peak voltage of the feed-through signal which, at this point, exceeds that of the received pulse. This is accomplished automatically as a result of applying the output of the automatic gain control circuit to the control grid of the cyclic tube which then becomes less negative and permits the cyclic voltage to rise and effectively suppress the feed-through signal in the fourth and fifth stages of the I. F. amplifier strip.

It is apparent, therefore, that the proposed methods and means provide effectively to automatically vary the cyclic gain control voltage so that the feed-through signal is suppressed when the altimeter is operating at altitudes at which the weaker reflected pulse would be over-ridden and distortion of the received pulse avoided by applying little or no cyclic gain control at altitudes at which the reflected signal is strong enough to over-ride the feed-through signal.

The "sensitivity time control circuit" recited in the claims is defined as a gain control circuit which decreases the gain of the amplifier controlled thereby immediately upon transmission of a radio pulse and which automatically causes the gain of said amplifier to increase thereafter to a maximum desired gain before the next succeeding radio pulse is transmitted.

What is claimed is:

1. A pulse echo altimeter comprising means for transmitting a pulse of radio energy to a reflecting object, means for receiving and amplifying said pulse after reflection from said object including an intermediate frequency amplifier, an automatic gain control circuit for said amplifier, a sensitivity time control circuit for said amplifier, means for keying said sensitivity time control circuit substantially simultaneously with the keying of said transmitter, a distance indicating means responsive to the reception of the received pulse for indicating the distance to the reflecting object; in combination with means including said automatic gain control circuit for supplying a voltage output that is a function of said distance, and means for so applying said output to said sensitivity time control circuit as to reduce the amount that said sensitivity time control circuit reduces the gain of said amplifier as said distance decreases.

2. A pulse echo altimeter comprising means for transmitting a pulse or radio energy to a reflecting object, means for receiving and amplifying said pulse after reflection from said object including an intermediate frequency amplifier comprising a plurality of stages, an automatic gain control, and a sensitivity time control circuit, said automatic gain control being adapted to regulate the gain of a first group of stages of said amplifier, said sensitivity time control circuit being adapted to regulate the gain of a second group of stages of said amplifier and adapted to being keyed substantially simultaneously with said transmitter, a pulse-shaper triggered by the received and amplified pulse, servo mechanism means keyed by the peak voltage output of said pulse-shaper for determining and indicating the distance from the altimeter to the reflecting object; in combination with a potentiometer operably connected with said distance indicator to be driven thereby and having a voltage output which varies according to the distance indicated, said output being so applied to said sensitivity time control circuit as to reduce the amount that said sensitivity time control circuit reduces the gain of said amplifier as said distance decreases.

3. A pulse echo altimeter comprising means for transmitting a pulse of radio energy to a reflecting object, means for receiving and amplifying said pulse after reflection from said object including an intermediate frequency amplifier comprising a plurality of stages, an automatic gain control, and a sensitivity time control circuit, said automatic gain control being adapted to regulate the gain of a first group of stages of said amplifier, said sensitivity time control circuit being adapted to regulate the gain of a second group of stages of said amplifier and adapted to being keyed substantially simultaneously with said transmitter, a pulse-shaper triggered by the received and amplified pulse, servo mechanism means keyed by the peak voltage output of said pulse-shaper for determining and indicating the distance from the altimeter to the reflecting object; in combination with means for applying a portion of the output of said automatic gain control to said sensitivity time control circuit for regulating the output of said sensitivity time control circuit.

4. A pulse echo altimeter comprising means for transmitting a pulse of radio energy to a reflecting object, means for receiving and amplifying said pulse after reflection from said object including an intermediate frequency amplifier comprising a plurality of stages, an automatic gain control, and a sensitivity time control circuit including a gain control tube having a control electrode, said automatic gain control being adapted to regulate the gain of a first group of stages of said amplifier, said sensitivity time control circuit being adapted to regulate the gain of a second group of stages of said amplifier and adapted to being keyed substantially simultaneously with said transmitter, a pulse-shaper triggered by the received and amplified pulse, means keyed by the peak voltage output of said pulse-shaper for determining and indicating the distance from the altimeter to the reflecting object; in combination with means for applying a portion of the output of said automatic gain control to the control electrode of said gain control tube.

5. A pulse echo altimeter comprising means for transmitting a pulse of radio energy to a reflecting object, means for receiving and amplifying the pulse after reflection from the object including an intermediate frequency amplifier comprising at least five stages, an automatic gain control, a sensitivity time control circuit, said automatic gain control being adapted to regulate the gain of the first three stages of the intermediate frequency amplifier, said sensitivity time control circuit comprising a multi-element vacuum tube having a control electrode and being keyed substantially simultaneously with said transmitter and connected to and regulating the gain of the fourth and fifth stages of the intermediate frequency amplifier, a pulse-shaper triggered by the received and amplified pulse, means keyed by the peak voltage output of said pulse-shaper for determining and indicating the distance from the altimeter to the reflecting object; in combination with means for applying a portion of the output of said automatic gain control to the control electrode of said gain control tube.

6. A pulse echo altimeter comprising means for transmitting a pulse of radio energy to a reflecting object, means for receiving and amplifying the pulse after reflection from the object including an intermediate frequency amplifier comprising at least five stages, an automatic gain control, a sensitivity time control circuit, said automatic gain control being adapted to regulate the gain of the first three stages of the intermediate frequency amplifier, said sensitivity time control circuit comprising a multi-element vacuum tube having a control electrode and being keyed substantially simultaneously with said transmitter and connected to and regulating the gain of the fourth and fifth stages of the intermediate frequency amplifier, a pulse-shaper triggered by the received and amplified pulse, servo mechanism means keyed by the peak voltage output of said pulse-shaper for determining and indicating the distance from the altimeter to the reflecting object; in combination with a potentiometer operably connected with said distance indicator means to be driven thereby and having a voltage output which varies according to the distance indicated, said output being applied to the control electrode of said gain control tube.

7. A pulse-echo altimeter comprising means for transmitting a pulse of radio energy to a reflecting object, means for receiving and amplifying said pulse after reflection from said object including an intermediate frequency amplifier, a sensitivity time control circuit for said amplifier, means for keying said sensitivity time control circuit substantially simultaneously with the keying of said transmitter, a distance indicating means comprising servo mechanism means responsive to the reception of the received pulse for indicating the distance to the reflecting object; in combination with means for supplying a voltage output that is a function of said distance, and means for applying said output to said sensitivity time control circuit with such polarity as to decrease the amount that said sensitivity time control circuit reduces the gain of said amplifier as said distance decreases.

8. A pulse-echo altimeter comprising means for transmitting a pulse of radio energy to a reflecting object, means for receiving and amplifying said pulse after reflection from said object including an intermediate frequency amplifier, a sensitivity time control circuit for said amplifier, means for keying said sensitivity time control circuit substantially simultaneously with the keying of said transmitter, a distance indicating means responsive to the reception of the received pulse for indicating the distance to the reflecting object; in combination with means for supplying a voltage output that is a function of said distance, and means for applying said output to said sensitivity time control circuit with such polarity as to decrease the amount that said sensitivity time control circuit reduces the gain of said amplifier as said distance decreases and with such amplitude as to make said sensitivity time control circuit ineffective after said distance decreases to a distance substantially less than the distance where the amplitude of the received pulses equals the amplitude of the transmitted pulse fed through to the receiving means, and before the received pulse overlaps in time said pulse fed through.

9. A pulse-echo altimeter comprising means for transmitting a pulse of radio energy to a reflecting object, means for receiving and amplifying said pulse after reflection from said object including an intermediate frequency amplifier, an automatic gain control circuit for said amplifier, a sensitivity time control circuit for said amplifier, means for keying said sensitivity time control circuit substantially simultaneously with the keying of said transmitter, a distance indicating means responsive to the reception of the received pulse for indicating the distance to the reflecting object; in combination with means including said automatic gain control circuit for supplying a voltage output that is a function of said distance, and means for applying said output to said sensitivity time control circuit with such polarity as to decrease the amount that said sensitivity time control circuit reduces the gain of said amplifier as said distance decreases.

10. A pulse-echo altimeter comprising means for transmitting a pulse of radio energy to a reflecting object, means for receiving and amplifying said pulse after reflection from said object including an intermediate frequency amplifier comprising a plurality of stages, an automatic gain control circuit, and a sensitivity time control circuit, said automatic gain control circuit being adapted to regulate the gain of a first group of stages of said amplifier, said sensitivity time control circuit being adapted to regulate the gain of a second group of stages of said amplifier and adapted to being keyed substantially simultaneously with said transmitter, servo mechanism means responsive to the reception of the received pulse for indicating the distance from the altimeter to the reflecting object; in combination with a potentiometer operably connected with said distance indicator to be driven thereby and having a voltage output which varies according to the distance indicated, and means for applying said output to said sensitivity time control circuit with such polarity as to decrease the amount that said sensitivity time control circuit reduces the gain of said amplifier as said distance decreases.

11. A pulse-echo distance measuring system comprising means for transmitting a pulse of radio energy to a reflecting object, means including an amplifier for receiving and amplifying said pulse after reflection from said object, gain control means for said amplifier, means for causing said gain control means to decrease the gain of said amplifier immediately upon transmission of a pulse of radio energy and means for causing said gain control means to increase the gain of said amplifier thereafter to a maximum desired gain before the next succeeding pulse of radio energy is transmitted, a distance indicating means responsive to the reception of the received pulse for indicating the distance to the reflecting object, and means responsive to decreases in said distance for decreasing the amount that said gain control means reduces the gain of said amplifier as said distance decreases.

12. The invention according to claim 11 wherein said distance indicating means comprises a servo mechanism responsive to the received pulse and wherein there is a potentiometer operably connected with said servo mechanism to be driven thereby and having a voltage output which varies according to the distance indicated, and wherein said last means includes means for applying said output to said gain control means.

References Cited in the file of this patent
UNITED STATES PATENTS

| | | |
|---|---|---|
| 2,009,459 | Turner | July 30, 1935 |
| 2,167,492 | Sproule | July 25, 1939 |
| 2,249,181 | Shephard | July 15, 1941 |
| 2,309,314 | Harshaw | Jan. 26, 1943 |
| 2,422,074 | Bond | June 10, 1947 |
| 2,423,334 | Bedford | June 17, 1947 |
| 2,427,366 | Mozley et al. | Sept. 16, 1947 |
| 2,427,523 | Dolberg et al. | Sept. 16, 1947 |
| 2,429,623 | Hoisington | Oct. 28, 1947 |
| 2,439,044 | Ferrill | Apr. 6, 1948 |
| 2,498,381 | Smith | Feb. 21, 1950 |